E. RÈ.
NON-REFILLABLE BOTTLE.
APPLICATION FILED JUNE 17, 1914.

1,148,255.

Patented July 27, 1915.

Witnesses:
Harry H. Reiss
George G. Anderson

Inventor:
EUGENE RÈ,
by Hugh K. Wagner,
His Attorney.

UNITED STATES PATENT OFFICE.

EUGENE RÈ, OF ST. LOUIS, MISSOURI.

NON-REFILLABLE BOTTLE.

1,148,255. Specification of Letters Patent. Patented July 27, 1915.

Application filed June 17, 1914. Serial No. 845,579.

*To all whom it may concern:*

Be it known that I, EUGENE RÈ, formerly a subject of the King of Italy, but who, in accordance with the naturalization laws of the United States, has declared his intention to become a citizen of the United States, residing at the city of St. Louis, and State of Missouri, have invented certain new and useful Improvements in Non-Refillable Bottles, of which the following is a specification.

This invention relates to improvements in non-refillable bottles and has for its object to provide means of a simple and cheap construction which will permit the contents of the bottle to be discharged but will prevent the bottle from being refilled after said contents have been discharged therefrom.

A further object of this invention is to provide means for this purpose which means may be constructed in connection with new bottles at the time of their manufacture or may be applied to bottles in general use to constitute a non-refillable bottle.

Figure 1:
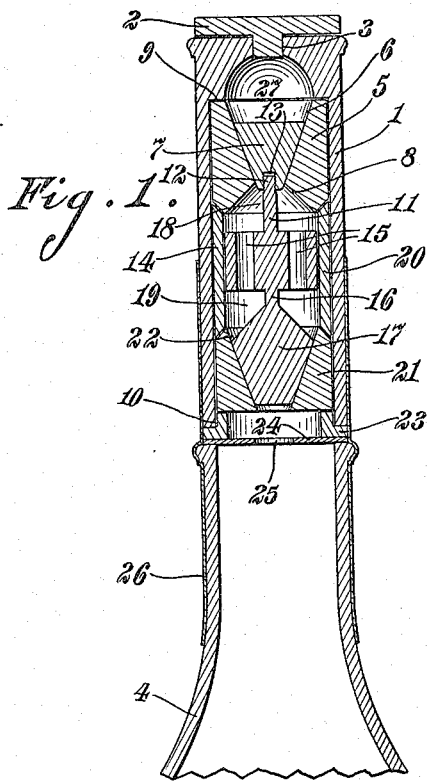
Figure 2:
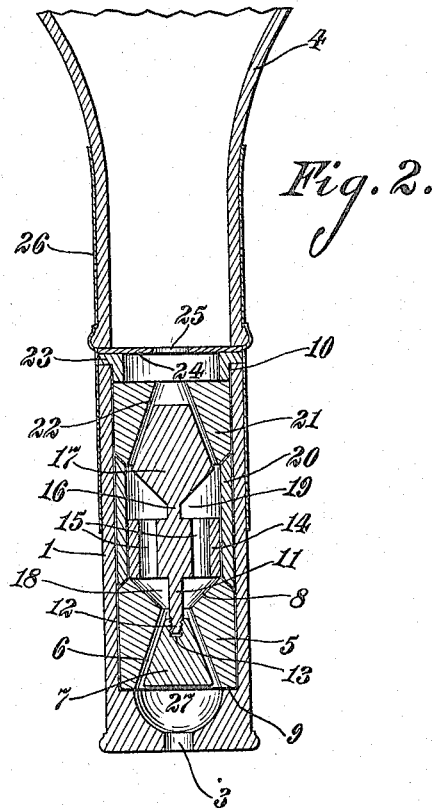
Figure 3:
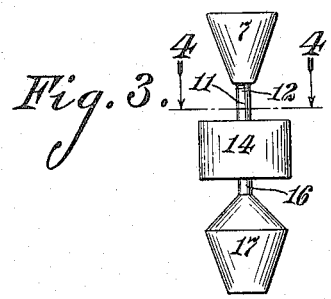
Figure 4:
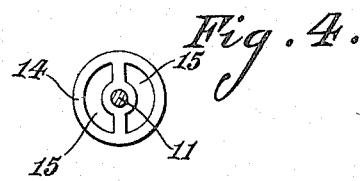

In the accompanying drawings, forming part of this specification, in which like numbers of reference denote like parts wherever they occur, Figure 1 is a vertical sectional view of the non-refillable bottle of this invention standing upright with the valve mechanism in closed position, the larger part of the body of the bottle being broken away; Fig. 2 is the same view as Fig. 1 with the bottle inverted and the parts in open position for discharging the contents of the bottle; Fig. 3 is a side view of the two connected valves and associated parts; and Fig. 4 is a sectional view looking downward on the line 4—4, Fig. 3.

The casing 1 (preferably a hollow cylinder) open at both ends is provided with a stopper 2 for the outer opening or stopper-hole 3 from which stopper-hole the contents of the bottle-body 4 (secured to said casing as hereinafter described) may be discharged when the bottle is inclined or inverted as shown in Fig. 2. A hollow member 5 adapted to fit inside casing 1 against the inner side of said casing is constructed with a conical shaped hollow-portion 6 so that the larger mouth of said hollow-portion is opposite the stopper-hole 3 when said member is in place in casing 1 and the smaller mouth of said hollow-portion is opposite said larger mouth, the sloping sides of said hollow portion 6 of said member 5 being adapted to form a conical valve-seat for the conical valve 7. A recess 8 is formed in the end of said member 5 adjacent to the smaller mouth of said hollow portion 6, and the upper edge of said member 5 adjacent to the larger mouth of the conical hollow portion 6 is adapted to rest against a shoulder 9 of said casing 1 adjacent to the outer opening 3. It is understood that the hollow inside or throat of the casing 1 is so constructed that before said casing is secured in place upon the bottle-body 4, as hereinafter described, the member 5 and other parts associated therewith (hereinafter described) may be inserted in said hollow or throat of said casing through the opening 10 at the end of the casing opposite the stopper-hole 3.

Before inserting member 5 in place, as above described, in casing 1, the conical valve 7 may be seated in the valve-seat provided by the sides of said hollow portion 6 in member 5.

A stem 11 having a threaded end 12 or the like adapted to engage a threaded hole 13 or the like in valve 7 for attaching said valve 7 to said stem 11, bears an enlarged portion 14 having channels 15 therethrough and said enlarged portion bearing a stem 16 opposite stem 11, said stem 16 bearing a second conical valve 17, said parts 11, 14, 16, and 17 being preferably made in one piece. Before member 5 with valve 7 seated in its valve-seat in said member 5 is inserted into the casing 1, or afterwards, the threaded end 12 of stem 11 is screwed into the threaded hole 13 of valve 7 thus connecting said valve 7 with stem 11 and its associated parts 14, 16, and 17. It is, of course, understood that if member 5 is made of two or more pieces by dividing said member 5 lengthwise the casing 1 to form said pieces, then, in that case, valve 7, stem 11, enlarged portion 14, stem 16, and valve 17 may be made in one piece and may be assembled outside the casing 1 by surrounding said valve 7 with the pieces composing member 5, after which said member 5 with valve 7 seated in its valve-seat in member 5, and the parts 11, 14, 16, and 17 may be inserted in casing 1 as hereinabove described.

The channels 15 in the enlarged portion 14 may be two in number and formed as shown in Figs. 1, 2, and 4, or there may be one channel or any number of channels more than one formed in any suitable shape or manner to effect communication between the spaces 18 and spaces 19, said spaces 18 being adjacent to stem 11 and valve 7, and said spaces 19 being adjacent to stem 16 and valve 17.

A sleeve 20 is inserted in casing 1 between the inside of said casing 1 and enlarged portion 14, the upper edge of which sleeve is adapted to abut and fit against the lower edge of member 5 said lower edge of member 5 being adjacent the recess 8 in said member 5 and the lower edge of said sleeve 20 is adapted to abut and fit against the upper edge of a hollow member 21 which upper edge of member 21 is adjacent to the larger mouth of the conical shaped hollow portion 22, the sides of which hollow portion 22 form the conical valve-seat for the conical valve 17 and said member 21 being adapted to fit in casing 1 and to be inserted therein in place as shown in Figs. 1 and 2, and the inner side of said sleeve 20 providing a surface against which the outer side of enlarged portion 14 may slide as valve 7 and valve 17 are seated and unseated in their respective seats as hereinafter described.

It is evident that as the enlarged portion 14 slides along the inner side of sleeve 20 when the bottle is inclined or is inverted (Fig. 2) the upper edge, or the edge of the end of enlarged portion 14 nearest valve 7 strikes against the side of the recess 8 in member 5, and thus limits the outward movement of valve 7 and valve 17 connected with valve 7, as shown in Fig. 2, as said valves 7 and 17 are unseated from their respective valve-seats for permitting the contents of the bottle-body to be discharged, moreover, said enlarged portion 14 adds weight to said valves 7 and 17 and the additional weight operates to seat said valves more firmly in their respective seats when the device of this invention is in normal or closed position (Fig. 1) and facilitates the unseating of said valves from their respective seats when the bottle is inclined or inverted (Fig. 2) for discharging the contents of the bottle.

A washer 23 or the like (said washer having preferably an angular cross-section as shown in Figs. 1 and 2 of the drawings) fits upon the lower end of casing 1 and abuts and rests against the lower edge of member 21 adjacent the smaller mouth of the conical hollow portion 22 and holding all the parts above-described in place in said casing 1.

A gasket 24 of any suitable material, such, for instance, as cork, leather, rubber or the like (said gasket having an opening 25 of any suitable size and shape), placed between the edge of casing 1 and the adjacent edge of the bottle-body 4, forms an intimate non-leaking union between said casing 1 and said bottle-body 4, and, for supporting said casing in place upon said bottle-body after said bottle-body has been filled, a wrapping 26 of any suitable material, such, for instance, as heavy tin-foil or the like is placed about the union of said casing 1 with said bottle-body 4 said wrapping extending for any desired distance above said union on the outside of said casing 1 and below said union on the outside of bottle-body 4. Instead of the wrapping 26 described, the means of supporting casing 1 in place upon bottle-body 4 may be a casing of any suitable material.

Casing 1, member 5, valve 7, stem 11, member 14, stem 16, valve 17, sleeve 20, member 21, and washer 23 are preferably made of porcelain, but may be made of any other suitable material, such, for instance, as glass, metal, or the like.

The normal position of the valves and the associated parts of the non-refillable bottle of this invention is shown in Fig. 1, and when the bottle is standing upright with said parts in normal position as shown in said Fig. 1, the valve 17 is seated in its valve-seat in member 21 and the valve 7 is seated in its valve-seat in member 5 so that a liquid or the like cannot be poured into the bottle through the stopper-hole 3. When the bottle is sufficiently inclined or is inverted as shown in Fig. 2, the weight of the valve mechanism causes valve 17 to unseat from its valve-seat, and valve 7 connected with valve 17 by means of parts 11, 14, and 16, as hereinabove described, unseats from its valve-seat and the contents of the bottle will flow from bottle-body 4 through opening 25 in gasket 24 along the space between the sides of valve 17 and its valve-seat into spaces 19 thence through channels 15 in member 14 to spaces 18 thence along the space between the sides of valve 7 and its valve-seat into a space 27 of any suitable shape formed between the shoulder 9 and the stopper-hole 3, thence through said stopper-hole (the stopper, of course, having been removed). When the bottle is again placed in upright position (Fig. 1), valves 7 and 17 will again be seated in their respective seats in closed position as shown in Fig. 1, and when the contents of the bottle has all been discharged, the bottle cannot again be refilled because when said bottle is in upright position as shown in Fig. 1, the valves will be in closed position, and, should an attempt be made to forcibly inject a liquid or the like under pressure into the bottle while the bottle is in inclined position or inverted as shown in Fig. 2 with the valves in open position, the force of said liquid or the like under pressure striking valve 7 will seat said valve and valve 17 connected with said valve 7 in their respective seats in closed position shown in Fig. 1.

The device of this invention may be applied to bottles in use or may be applied to new bottles in their manufacture.

Various changes in the details of construction and arrangement of parts may be made without departing from the nature and spirit of this invention.

I claim:

1. In a non-refillable bottle, the combination with a bottle-body, of a valve-casing secured thereto, two conical valves each adapted to seat and unseat simultaneously with the other in their respective valve-seats, a hollow member adapted to be inserted in said valve-casing said hollow member bearing a conical valve-seat for one of said two conical valves, a shoulder in said casing said shoulder adapted to engage an edge of said second hollow member, a hollow member adapted to be inserted in said valve-casing said hollow member bearing a conical valve-seat for the other of the said two conical valves, a third hollow member adapted to be inserted in said valve-casing intermediate said conical valve-seat bearing members and adapted to maintain said conical valve-seat bearing members in spaced relation to each other, a fourth hollow member adapted to be inserted in said valve-casing an edge of said hollow member adapted to rest against an edge of the lowermost of said valve-seat bearing members a flange on said last named hollow member said flange being adapted to engage an edge of said valve-casing to coöperate with said shoulder for maintaining said valve-seat bearing members and said intermediate spacing member in position in said valve-casing, a member connecting said two conical valves, and a channeled member borne by said connecting member intermediate said two valves said channeled member being slidably mounted in the third hollow member.

2. In a non-refillable bottle the combination with the bottle neck, of a separable and detachable casing open at both ends, means for securing said casing upon the bottle neck in longitudinal alinement therewith, an outer valve-seat bearing member located within said casing, an inner valve-seat bearing member located within said casing, a spacing-member located within said casing between said inner and outer valve-seat bearing members, valves adapted to engage the seats of said valve-seat bearing members, a connecting member between said valves, a guiding member carried by said connecting member, said guiding member being channeled for the passage of fluid therethrough and being slidably mounted within said spacing-member said spacing member serving the double function of spacing the valve-seat bearing members apart and serving as a guide for said guiding member, the several parts being held in assembled relation by the securing of the detachable casing upon the bottle neck.

3. In a device of the character described the combination with a bottle having a neck, of a detachable casing, means for securing said casing upon said bottle neck in alinement therewith, said casing being hollow and being open at both ends, a plurality of valve-seat bearing members located within said casing, means located within said casing for holding said valve-seat bearing members in spaced relation, valves arranged to engage the seats of such valve-seat bearing members, a connecting means between said valves, and means bearing between the bottle neck and the lowermost of said valve-seat bearing members whereby the securing of the casing upon the bottle neck serves to draw the several parts longitudinally together to thereby hold them in their assembled relation.

In testimony whereof I hereunto affix my signature in the presence of two witnesses.

EUGENE RÈ.

Witnesses:
WALTER C. GUELS,
NANCY C. THOMAS.

Copies of this patent may be obtained for five cents each, by addressing the "Commissioner of Patents, Washington, D. C."